June 20, 1950 W. F. GEORSE 2,511,912
METHOD OF MAKING TOOLS
Filed Aug. 21, 1945 2 Sheets-Sheet 1

INVENTOR
William F. George
BY
Parker Prochnow & Farmer
ATTORNEYS

June 20, 1950 W. F. GEORSE 2,511,912
METHOD OF MAKING TOOLS
Filed Aug. 21, 1945 2 Sheets-Sheet 2
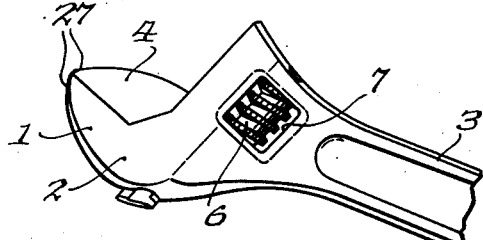
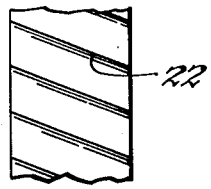
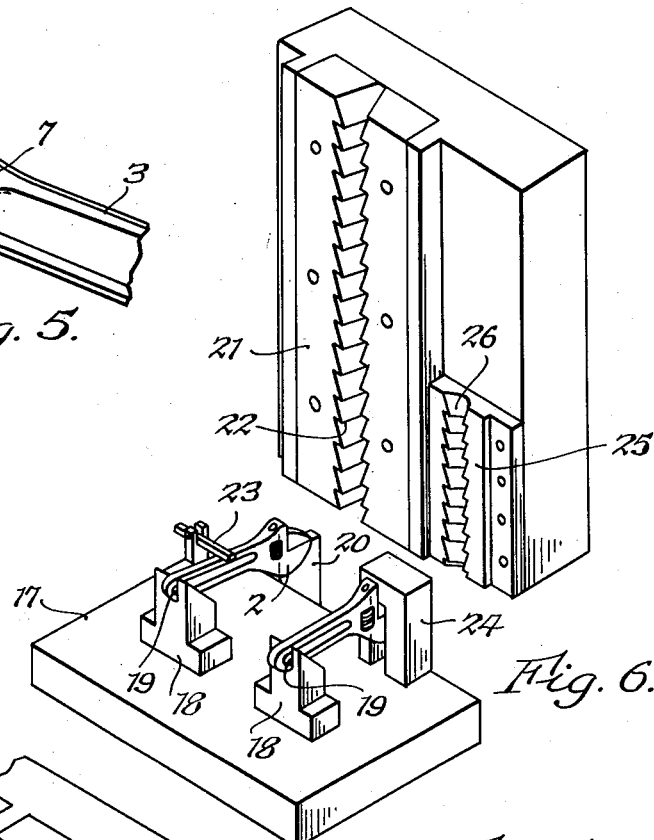
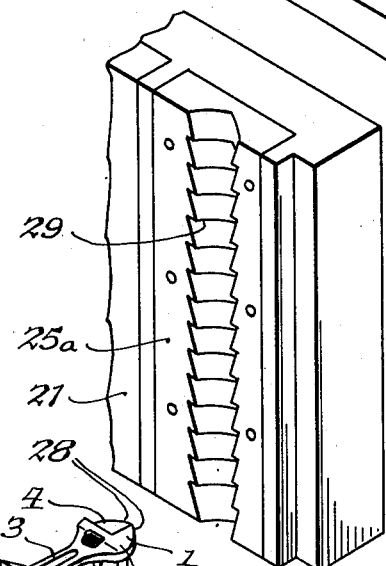
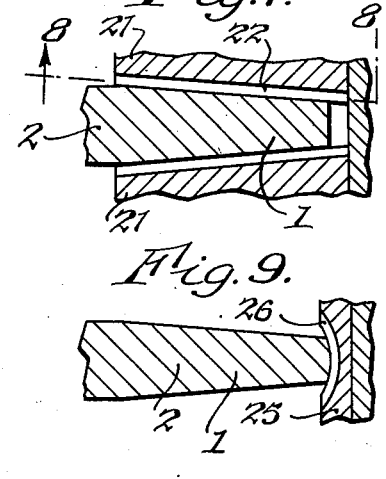
INVENTOR
William F. George
BY
Parker Prochnow & Farmer
ATTORNEYS Patented June 20, 1950

2,511,912

UNITED STATES PATENT OFFICE 2,511,912

METHOD OF MAKING TOOLS

William F. George, Buffalo, N. Y., assignor to J. H. Williams & Company, Buffalo, N. Y.

Application August 21, 1945, Serial No. 611,759

4 Claims. (Cl. 76—114)

This invention relates to a method of making tools, and more particularly to those having relatively movable jaws.

In U. S. Patent No. 2,112,840 to Haist, issued April 5, 1938, is disclosed a method of making an open end wrench with an adjustable jaw, in which the adjustable jaw is machined or fitted to the head by broaching operations. Heretofore the faces of the head and jaws of tools such as wrenches, have required a considerable number of hand operations, and the parts, after being heat treated and finished, were not interchangeable. The faces of the jaws and head were temporarily assembled and then finished to size with a grinding wheel, which is a hand operation, and then the nose of each jaw was finished by a similar hand grinding operation. After the parts were ground in this manner, the slidable jaw was separated, the burrs resulting from the grinding and polishing operation were removed, after which the parts were wired together during a hardening by heat treatment. The parts were then reassembled. This was necessary because the movable jaws were not interchangeable in different heads. The large number of hand operations required, and keeping the individually fitted parts together, made such tools relatively expensive, so that the advantages of such a method of manufacture were not available in the mass production of low priced tools.

An object of this invention is to provide an improved simple, practical and inexpensive method of making tools having relatively moving parts; with which the hand operations are substantially reduced; with which the interfitted parts are interchangeable with other similarly formed parts, with which the cost of manufacture is substantially reduced so that the advantages of the method are applicable to mass production of relatively low priced tools; and with which the hand operations heretofore required for removing burrs and for polishing are eliminated.

Other objects and advantages will be apparent from the following description of two applications of the invention, and the novel features will be particularly pointed out hereinafter in connection with the appended claims.

In the accompanying drawings:

Fig. 5 is a similar view after the assembly has been completed, and the tool is ready for subsequent and additional broaching operations;

Fig. 6 is a perspective of a jig and broach used for finish broaching of the sides and the tip or nose of a wrench in accordance with this invention;

Fig. 7 is a sectional plan, on a larger scale, through a portion of the broach used for finishing the side faces of the wrench, and an end of the wrench being operated upon;

Fig. 8 is a sectional elevation, on a smaller scale, of a portion of the broach to show the inclination of the teeth, the section being taken approximately along the line 8—8 of Fig. 7;

Fig. 9 is a sectional plan, on the scale of Fig. 7, of a wrench end and a portion of the broach which finishes the nose of the wrench; and Fig. 10 is a perspective of the right-hand jig and broach of Fig. 6 modified to finish the nose of the wrench in a slightly different manner.

Figure 1:
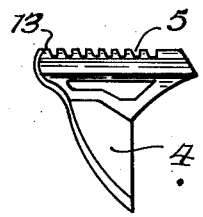
Fig. 1 is a perspective of the movable jaw of an open end wrench in an intermediate stage of manufacture.
Figure 2:
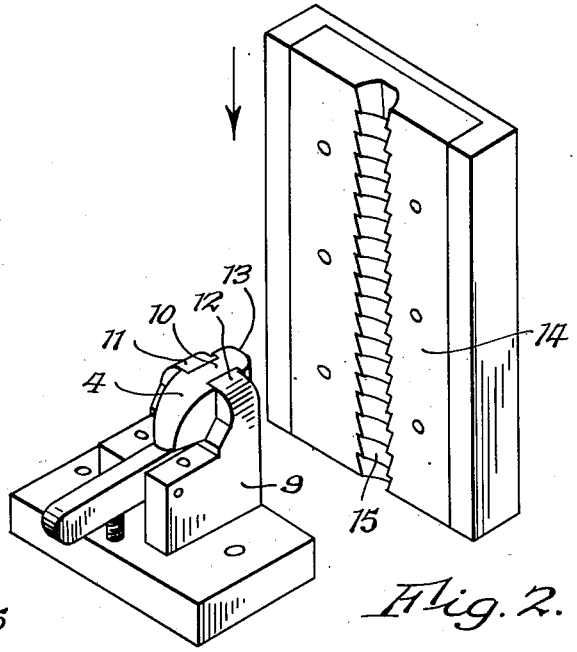
Fig. 2 is a perspective of a broach and jig used for finish sizing of the exterior surface of the rack of the movable jaw of Fig. 1 in a single operation.
Figure 3:
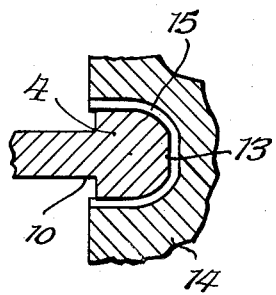
Fig. 3 is a sectional plan through the jaw and broach during a broaching operation.
Figure 4:
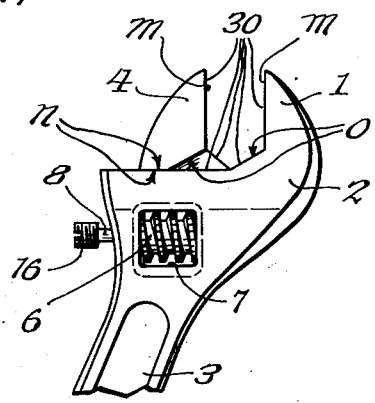
Fig. 4 is an elevation of part of the wrench during the process of assembly.

In the embodiment of the invention illustrated in Figs. 1 to 9, the invention is applied to an open end adjustable wrench of the type having a relatively fixed jaw 1, a head 2, a handle 3, and a movable jaw 4. The jaw 4 is slidingly mounted in the head 2 so as to move toward and from the fixed jaw 1. The adjustable jaw 4 carries rack teeth 5 formed in an edge thereof which slides within the head 2, and a worm screw 6, rotatably mounted in an aperture or window 7 of the head 2 on a pivot pin or screw 8 (Fig. 4), meshes with the rack teeth 5, so that by rotating the screw 6, the jaw 4 may be shifted toward and from the fixed jaw 1. This is a well known type of open end, adjustable wrench, and this invention relates to an improved method of making such a wrench and other tools where similar problems exist.

In accordance with this invention the movable jaw 4 and the head 2 have their interfitting sliding surfaces machined, as disclosed in said Haist Patent No. 2,122,840 above identified, and after these interfitting surfaces have been finished, the rack teeth are cut in the movable jaw. The clamping faces m, the bearing surfaces n and cooperating faces or surfaces O (Fig. 4) of both movable jaw 4 and the head 2 and fixed jaw 1, are also machined to size. The parts are then hardened in a suitable manner, such as by heating followed by quenching. The hardened jaw 4 is next disposed in a suitable jig 9, Fig. 2, in which, for example, the relatively narrow, flat faced alignment throat 10 of the jaw is gripped by opposed tongues 11 and 12 of the jig, which snugly fit the throat 10 and hold the jaw rigidly, with the edge 13 carrying the rack teeth vertical, projecting beyond the jig, and exposed.

This edge 13 is then form broached by a suitable broach 14 having broaching teeth 15, which finishes the face in which the rack teeth 5 are cut, and the sides adjoining that face, all in a single operation. This form broaching corrects for any warpage in the jaw that might have occurred during the hardening, and removes any burrs from the rack teeth that might have been formed in the milling operation. This broaching operation thus finishes the three sides or faces of the marginal edge of the movable jaw, to predetermined tolerances.

The head 2, which was machined in accordance with said Haist patent and then hardened, and the movable jaw 4, are now assembled. The jaw 4 is first slid into the head 2 as usual, the usual worm spring (not shown) applied to the screw 6, and the latter placed in position in the window 7, and secured therein by inserting the pin 8 which serves as the bearing for the screw. The pin 8 has a threaded end 16 which is threaded into the head 2 to secure it against removal. At this time the jaws 1 and 4, and the head 2, have different and variable thicknesses, so that the side faces of the head and jaws are not in corresponding planes. After the movable jaw 4 has been attached to the head 2, the movable jaw is preferably shifted into contact with the fixed jaw 1, as shown in Fig. 5.

This assembled tool is then placed in a suitable jig 17 (Fig. 6) such as one having a post 18 with a slot 19, in which the handle of the wrench or tool is received, and a pillow 20 with a concave seat that receives and holds the head 2 of the wrench, with the side faces of the head 2 approximately vertical. With the tool or wrench mounted in this manner, the side faces of the head 2 and jaws 1 and 4 are surface broached by a suitable broach 21 having spaced groups of broaching teeth 22, and moving vertically in straddling relation to the head and jaws, as shown in Fig. 7. This single broaching operation machines and finishes the side faces of the head and jaws of the wrench. The wrench may be held in the jig by a removable pin 23.

After the side faces of a wrench have been finished in this manner, it is removed from the jig, and placed in a second suitable jig, such as one having a pedestal 18 with slot 19 for mounting the handle, but with the head of the wrench confined by an inverted U-shaped holder 24. This holder exposes the tip or nose of the wrench for a further form broaching operation. This further form broaching operation is performed by a broach 25 having teeth 26, which curves slightly the tip or nose of the jaws, and cuts them off at the desired length (Fig. 9). The broach 25 is mounted alongside of the broach 21, and on the same carrier or support, so that when the broach 21 is machining the side opposite faces of one tool, the broach 25 will simultaneously broach the nose 27 of another tool (Fig. 5).

Thus, after each operation, a finished tool is removed from the right-hand jig mounting, the tool from the left-hand mounting in Fig. 6 placed in the right-hand mounting, and a new tool with unfinished faces placed in the left-hand mounting. In this manner two different broaching operations are performed on two tools at a single stroke of the broaching machine, as will be obvious in Fig. 6.

In Fig. 10 is disposed a modification of the right-hand mounting for the tool, and a different form broach 25a which may replace the broach 25. In this modification, the jig mounting 27 supports the tool in a generally horizontal position, with the side faces that have just been previously surface broached, generally horizontal or at right angles to the positions occupied in the left-hand mounting in Fig. 6. With the tool held in this position the profile and tip areas 28 of the tool are form broached to the desired shape and size in a single operation by the teeth 29 of the broach 25a. This operation produces a finished surface on the areas 28.

The broaches have their teeth positioned to provide an oblique shearing action, which eliminates objectionable formation of burrs on the working surfaces in each of the broaching operations, and for this purpose the teeth of each broach make an acute angle with the direction of their travel during a broaching operation, and also with respect to the sides or edges 30 (Fig. 4) of the abutting faces of the jaws. This relatively oblique, shearing action produces a minimum of burrs in the broaching operation, and the formation of such burrs at the abutting faces of the jaws is further reduced by having the jaws closed or in contact with each other when the side faces are finished.

The teeth of each broach preferably make angles of somewhere between approximately 1° and 30° with a normal to the direction of travel of the broaches in the broaching operation, and the jig mountings for each tool preferably support the head of the tool, in a position such that there will be an oblique movement of the broach teeth across all of the edges 30 of the jaws during the broaching operation.

The invention has been described in connection with the manufacture of an adjustable end wrench as one example, but it will be understood that the method is also applicable to other tools and devices where similar problems are encountered. For example, the same principle of finishing tools may also be applied to pliers, clamps, various types of adjustable wrenches, pipe vise jaws, and pipe tong jaws and handles.

In all of such devices having interfitting parts, uniformity and interchangeability is possible, because the finishing of the side faces and of the profile and nose is performed after assembly by accurate machine operations, while the tools are located in jigs. For example, in the adjustable end wrench selected for illustration, any movable jaw of any wrench, tong or plier may be substituted for that in any similar other article manufactured in this manner, with proper matching of the side faces, nose and profile.

In accordance with this method, the broaching leaves smooth surfaces with a high finish, which usually requires little further polishing. This finish is not lost because no further heat treatment for hardening is necessary. Various broaches are available for such work, and they may be made from carbon steel, alloy steel, high speed steel, cobalt alloys (Stellite), and sintered carbide cutting materials.

By the application of this improved method to the manufacture of tools, it is possible to produce tools of maximum accuracy as to the dimensions, and have interchangeable, interfitting, relatively moving parts. The method also greatly reduces the cost of manufacture, so that a precision, accurately formed wrench with a minimum of clearance and play can be marketed at a relatively low cost in competition with the low cost cheap, crude and inaccurate tools heretofore available in the market.

It will be understood that various changes in the details, materials and arrangements of parts, which have been herein described and illustrated in order to explain the nature of the invention may be made by those skilled in the art within the principle and scope of the invention, as expressed in the appended claims.

I claim:

1. The method of making an adjustable end wrench of the type having a unitary head, fixed jaw and handle, a sliding jaw, and a worm rotatably carried by the head and meshing with rack teeth carried by the sliding jaw, which comprises machining the interfitting and cooperating surfaces and clamping faces of the sliding jaw and head, hardening the sliding jaw and head, placing the heat hardened sliding jaw in a jig with its machined surfaces acting as the locating surfaces, face broaching the three sides of the sliding jaw in which the side with the rack teeth is the middle side, then assembling the sliding jaw in said head, mounting the assembled parts in a jig, and face broaching the jaws of the assembled parts while in said jig.

2. The method of making an adjustable end wrench of the type having a unitary head, fixed jaw and handle, a sliding jaw, and a worm rotatably carried by the head and meshing with rack teeth carried by the sliding jaw, which comprises machining the interfitting and cooperating surfaces and clamping faces of the sliding jaw and head, placing the sliding jaw in a jig with its machined surfaces acting as the locating surfaces, face broaching the three sides of the sliding jaw in which the side with the rack teeth is the middle side, then assembling the sliding jaw in said head, mounting the assembled parts in a jig, face broaching opposite faces of the jaws of the assembled parts while in said jig with one broach and in one broaching operation, holding the face broached parts in a jig with the previously broached faces approximately normal to the direction of broaching, and then form broaching the profiles of the noses of the jaws.

3. The method of making an adjustable end wrench of the type having a unitary head, fixed jaw and handle, a sliding jaw, and a worm rotatably carried by the head and meshing with rack teeth carried by the sliding jaw, which comprises machining the interfitting and cooperating surfaces and clamping faces of the sliding jaw and head, placing the sliding jaw in a jig with its machined surfaces acting as the locating surfaces, face broaching the three sides of the sliding jaw in which the side with the rack teeth is the middle side, then assembling the sliding jaw in said head, mounting the assembled parts in a jig, and face and form broaching the opposite faces of the jaws of the assembled parts while in said jig with one broach and in one broaching operation, the broaching teeth in face broaching of the jaws making acute angles to the side edges of the abutting faces of the assembled jaws.

4. The method of making an adjustable end wrench of the type having a unitary head, fixed jaw and handle, a sliding jaw, and a worm rotatably carried by the head and meshing with rack teeth carried by the sliding jaw, which comprises machining the interfitting and cooperating surfaces and clamping faces of the sliding jaw and head, placing the sliding jaw in a jig with its machined surfaces acting as the locating surfaces, face broaching the three sides of the sliding jaw in which the side with the rack teeth is the middle side, then assembling the sliding jaw in said head, and face and form broaching the opposite faces of the jaws of the assembled parts with one broaching tool and in one broaching operation.

WILLIAM F. GEORSE.

REFERENCES CITED

The following references are of record in the file of this patent:

UNITED STATES PATENTS

| Number | Name | Date |
| --- | --- | --- |
| 395,213 | Campfield | Dec. 25, 1888 |
| 489,523 | Carpenter | Jan. 10, 1893 |
| 1,177,738 | Thomason | Apr. 4, 1916 |
| 1,626,598 | Carlson | May 3, 1927 |
| 1,639,269 | Potschner | Aug. 16, 1927 |
| 1,696,392 | Eggenweiler et al. | Dec. 25, 1928 |
| 1,743,116 | Cook | Jan. 14, 1930 |
| 1,808,442 | Weide | June 2, 1931 |
| 1,915,657 | Findlater | June 27, 1933 |
| 1,916,516 | Landers | July 4, 1933 |
| 1,932,223 | Lundquist | Oct. 24, 1933 |
| 2,041,551 | Lapointe | May 19, 1936 |
| 2,056,491 | Stimson | Oct. 6, 1936 |
| 2,112,840 | Haist | Apr. 5, 1938 |